United States Patent [19]

Powers

[11] 4,238,109
[45] Dec. 9, 1980

[54] CONTROL VALVE
[75] Inventor: William H. Powers, Tulsa, Okla.
[73] Assignee: Badger Meter, Inc., Richmond, Calif.
[21] Appl. No.: 10,518
[22] Filed: Feb. 9, 1979
[51] Int. Cl.³ .......................................... F16K 31/126
[52] U.S. Cl. ..................................... 251/28; 251/61.2
[58] Field of Search ................................. 251/28, 61.2

[56] References Cited
U.S. PATENT DOCUMENTS

| | | | |
|---|---|---|---|
| 2,593,564 | 4/1952 | Ives | 251/28 |
| 2,623,543 | 12/1952 | Heinisch | 251/28 X |

Primary Examiner—Arnold Rosenthal
Attorney, Agent, or Firm—Lothrop & West

[57] ABSTRACT

A control valve has a body with an orifice open to an inlet port and to an outlet port. A valve sleeve is movable along an axis in the body to move a valve needle into and out of the orifice. A first bellows engages the body and valve sleeve to preclude leakage between them. An actuator housing on the body defines a first compartment and a second compartment spaced apart along the axis. There is a packing stem and an actuator stem secured to the valve sleeves and together extending through the first compartment into the second compartment. The stems carry devices to engage electrical circuit control mechanism in the first compartment. The end of the second compartment is closed by a mounting disc, and leakage between the actuator stem and the mounting disc is precluded by a packing. A recessed disc spans an end of the second compartment. There is a flexible diaphragm in the recessed disc partially spanning a chamber therein. Movement is transmitted along the axis between the flexible diaphragm and the actuator stem. A cap overlies the diaphragm and also partially defines the chamber. A pilot valve is in the cap and assists in conducting pressure fluid to and from the compartment. The diaphragm and the pilot valve are interconnected for conjoint action.

6 Claims, 5 Drawing Figures

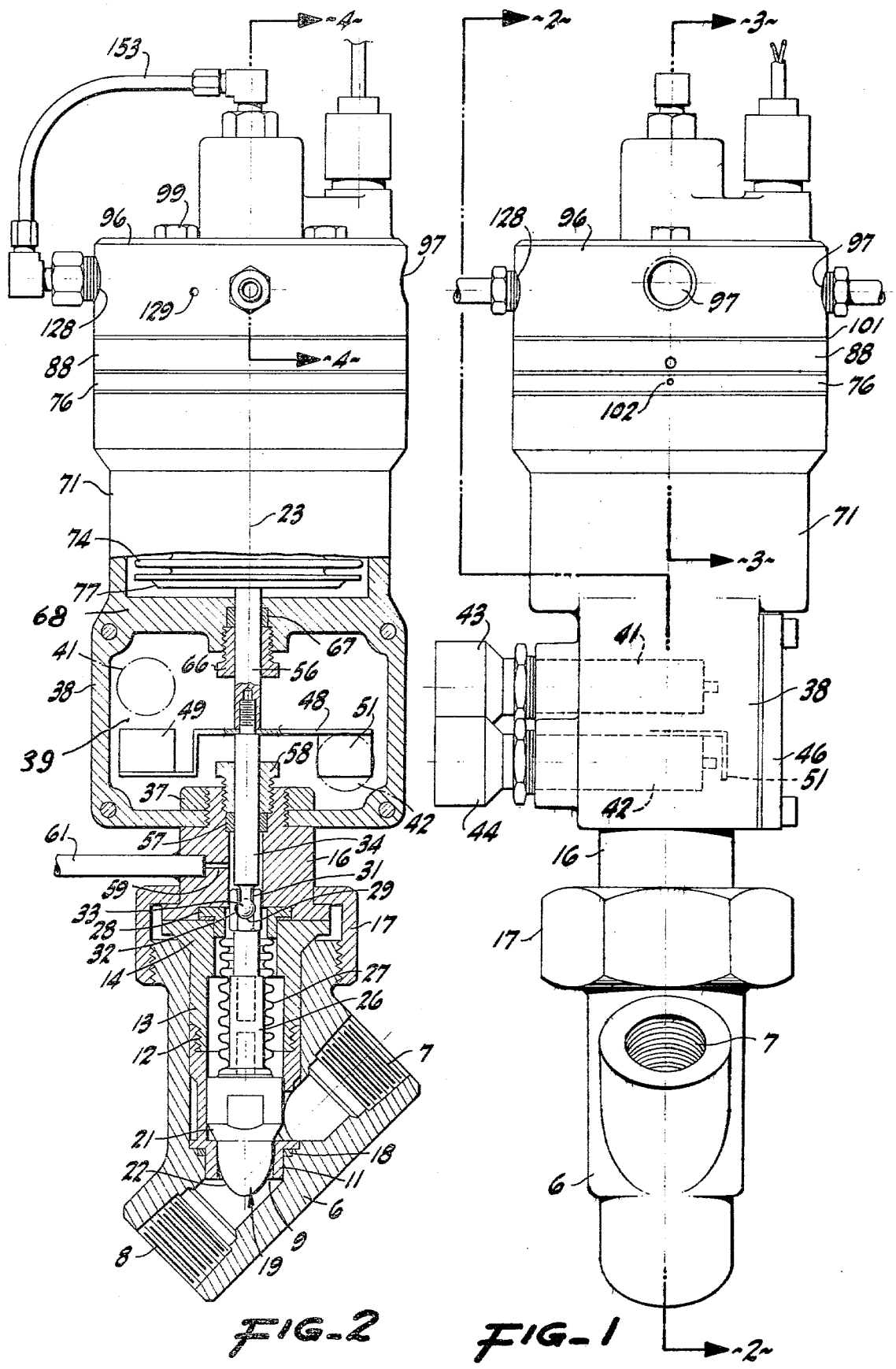

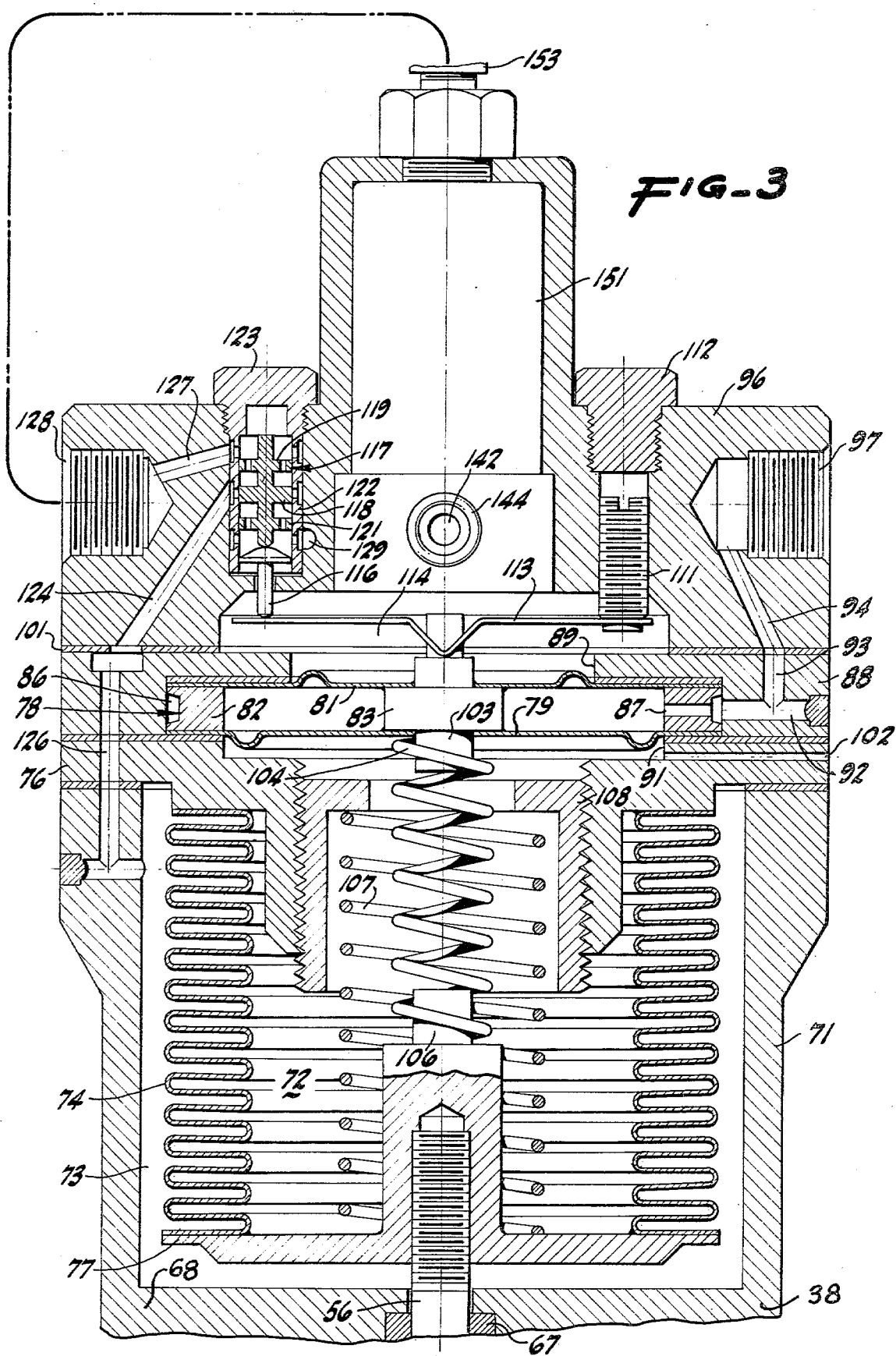

CONTROL VALVE

BRIEF SUMMARY OF THE INVENTION

A control valve is primarily for use in radioactive or other "contaminated" environments in which injury to the valve by radiation is precluded and in which leakage or comparable failure is inhibited. The valve can be operated either as an off-on valve or a modulating valve and is controlled from a remote point and preferably with an included servo mechanism. The valve has a valve body with a valve orifice in it for flow between an inlet port and an outlet port. A valve stem is movable along an axis in the body toward and away from the orifice. There is a first flexible member engaging the valve body and the valve stem for precluding leakage between them. Joined to the valve body is an actuator housing itself defining a first compartment and a second compartment spaced axially apart. An actuator stem is secured to the valve stem and extends through the first compartment into the second compartment. There is a circuit control mechanism on the actuator stem in the first compartment, the end of which is closed by a first disc. A second flexible member also engages the actuator stem, as well as said first disc, for precluding leakage therebetween. A second disc spans the end of the first compartment and at least partially defines a chamber in which a flexible diaphragm on the second disc and at least partially spanning the chamber is disposed. There is a means for transmitting movement along the axis between the flexible diaphragm and the actuator stem. A mounting disc overlies the second diaphragm and at least partially defines the chamber. A pilot valve in the cap controls flow of pressure fluid to and from the second compartment, and there are means in the chamber for interconnecting the diaphragm and the pilot valve for conjoint action.

BRIEF DESCRIPTION OF THE SEVERAL VIEWS OF THE DRAWINGS

FIG. 1 is a side elevation, portions being in cross-section on an axial plane, of a control valve pursuant to the invention.

FIG. 2 is a side elevation of the valve of FIG. 1, the view being at right angles to the view of FIG. 1.

FIG. 3 is an enlarged cross-section, the plane of which is indicated by the line 3—3 of FIG. 2, with portions of the figure being broken away.

DETAILED DESCRIPTION

Figure 4:
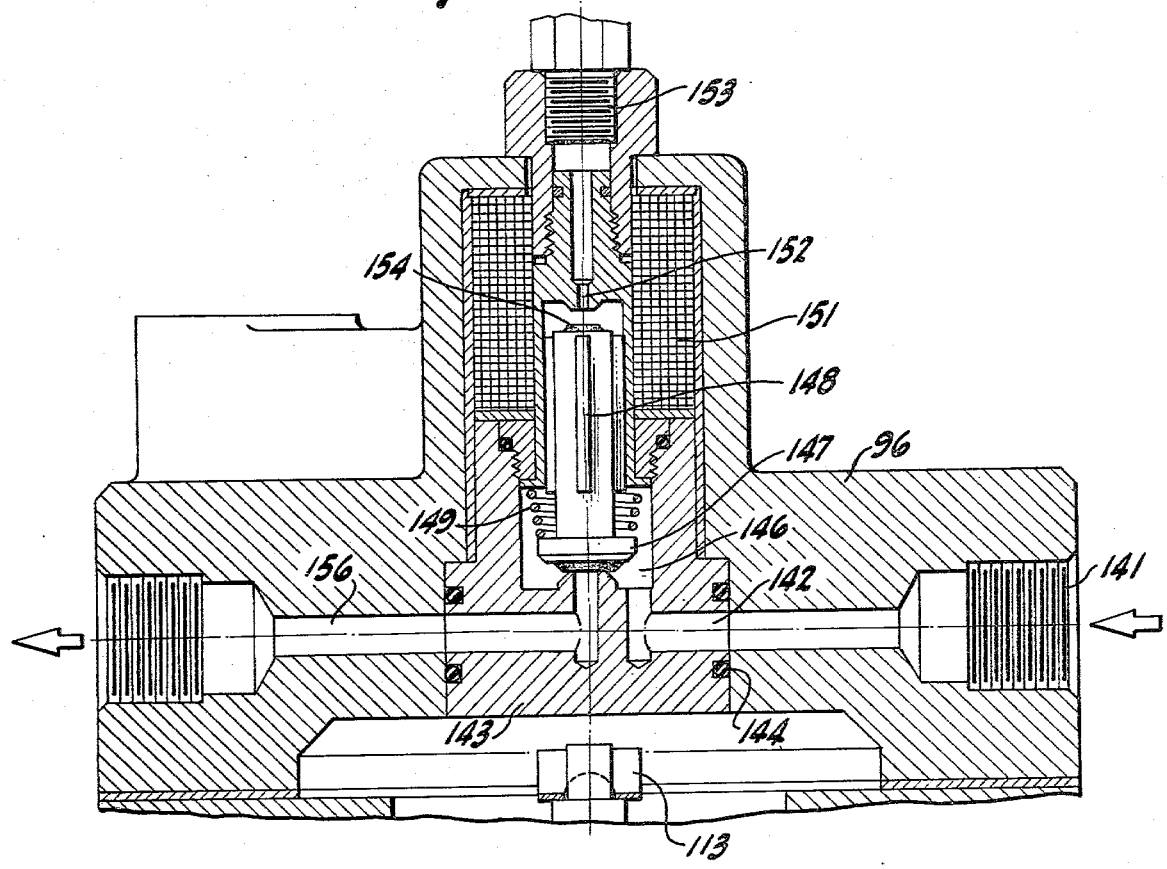
FIG. 4 is a cross-section to the scale of FIG. 3, the plane of section being indicated by the line 4—4 of FIG. 1.

While the control valve of the disclosure is effective in all sorts of environments to control the flow of various kinds of fluids, it has been particularly designed and utilized in connection with controlling the flow of gases in a radioactive environment.

The flow controlled is through a value body 6. The body 6 has an inlet port 7 and an outlet port 8 on opposite sides of a seat orifice 9 largely defined by a seat thimble 11 of special material disposed in the body 6 and having a threaded connection 12 to a seat tube 13 likewise disposed in the body and having a flanged terminus 14 butted against a flanged connector 16. A threaded inturned ring 17 abuts the flanged connector 16 and, when tightened, holds the seat thimble 11 in seated position. By releasing the inturned ring 17, the body 6 and associated structure can be removed for repair or replacement. A sealing ring 18 precludes leakage around the seat when the thimble 11 is in position.

Designed to cooperate with the seat thimble 11 is a valve needle 19, or inner valve, having a conical seat 21 adjoining the contoured end 22 of the needle 19 and arranged so that the valve needle can be moved along an axis 23 between a valve closed position and any one of several valve open positions. The valve needle 19 is partly guided in the seat thimble 11. Threadedly secured to the valve needle 19 is a sleeve 26 or stem at its lower end clamped against the lower end of a first bellows 27 disposed within the seat tube 13. At its upper end the first bellows 27 is secured to a mounting disc 28 clamped between the flanged terminus 14 and the flanged connector 16. Leakage around the conical seat 21 is precluded despite the fact that the valve needle 19 can move with respect to the body 6 along the axis 23.

To the upper end of the sleeve 26 is fastened a socket 29 having a small axial bore 31 and a somewhat larger, intersecting transverse bore 32. In the transverse bore 32 is seated a ball 33 at the lower end of a valve packing stem 34. When the transverse bore 32 is effectively positioned absent some of the surrounding mechanism, the ball 33 can readily be moved transversely into and out of engagement with the valve packing stems 34 so that the valve packing stem 34 and the socket 29 can be separated or, when engaged, can move along the axis 23 in unison.

Seated on the flanged connector 16 and held in position by a securing nut 37 is a lower actuator housing 38 serving to enclose a first or primary compartment 39 and as a mounting or enclosure for a pair of electrical switches 41 and 42 supplied through conduits 43 and 44 and accessible through a removable cover plate 46. The electrical switches 41 and 42 are controlled by an actuator bar 48 having actuators 49 and 51 thereon and itself secured to the top of the valve packing stem 34 by an upper, threaded actuator stem 56. Leakage along the stem 34 is precluded by a packing 57 and a packing nut 58. An escape port 59 opening into the interior of the flanged connector 16 is joined to a tube 61 leading to an appropriate discharge point. A similar packing nut 66 surrounds the upper portion of the upper actuator stem 56 and holds the packing 67 in position in a divider wall 68 topping the compartment 39, so that in general the compartment 39 for the switches is appropriately isolated.

As shown to a somewhat larger scale in FIG. 3, the lower actuator housing 38 is divided by an intervening wall 68 from an upper housing 71 partially enclosing an inner, primary compartment 72 and an outer, secondary compartment 73, the compartments being in part separated by a longitudinally extensible, flexible bellows 74. At its upper end the bellows 74 is joined to a mounting disc 76 overlying the upper end of the upper housing 71, with an intervening gasket, and at its lower end secured to a stem disc 77. A threaded hub on the stem disc 77 is mounted on the upper threaded end of the upper actuator stem 56, so that the upper actuator stem and the stem disc 77 move together and without leakage between the inner primary and outer secondary compartments 72 and 73. The remainder of the inner primary compartment 72 is also enclosed by a duplex diaphragm unit 78 seated on the mounting disc 76 and of special construction.

The duplex diaphragm unit 78 includes a lower, embossed, flexible disc 79 and an upper, embossed, flexible disc 81 disposed on opposite sides of a seating ring 82 and also on opposite sides of a central 83. The flexible discs 79 and 81, the hub and the seating ring 82 are secured together against leakage. The seating ring 82 has a peripheral groove 86 in communication with the volume between the flexible discs through an orifice 87. The duplex diaphragm unit 78 is seated against a gasket in a recessed disc 88 assembled above the mounting disc 76. A central opening 89 in the recessed disc 88 is substantially smaller in diameter than the central opening 91 in the mounting disc 76, so that the flexible discs 81 and 79 have different areas exposed to the exterior.

Communicating with the peripheral groove 86 around the seating ring 82 through bore 92 in the recessed disc 88 is a connecting passage 93 also in the recessed disc 88, the passage 93 itself opening through a bore 94 in a cap 96 to a pipe connection aperture 97. The various mounting disc 76, the recessed disc 88 and the cap 96 are secured together by axially extending bolts 99 (FIG. 2), and there are gaskets, such as 101, (FIG. 3) appropriately configured in order to afford leakproof passageways. In addition, there is a breathing passageway 102 (FIG. 3) extending from the inside of the primary compartment 72 to the atmosphere.

The central hub 83 has a boss 103 serving to center one end of a spring 104 at its opposite end centered on a boss 106 on the stem disc 77. Another spring 107 at its upper end bears against a threaded cup 108 engaging the mounting disc 76 in an axially adjustable fashion, whereas the other end of the spring 107 lies against the inside of the stem disc 77.

Means are provided for utilizing the differential motion of the flexible discs 79 and 81 to control pressure fluid effective on the exterior of the bellows 74 in the secondary compartment 73.

For that reason the cap 96 threadedly receives an adjusting screw 111 access to which is obtained by removal of a plug 112. Fulcrumed against the lower end of the adjusting screw 111 is an actuating lever 113 disposed in a chamber 114 within the cap 96. The central portion of the actuating lever 113 is contoured to rest against part of the central hub 83 secured to the flexible discs 79 and 81. The other end of the actuating lever 113 rests against the lower end of a guided valve stem 116.

A piston valve 117 abuts the valve stem 116. A central land 118 of the piston valve 117 is guided by pierced end lands 119 and 121 all reciprocable in a valve sleeve 122 mounted in the cap 96 below a removable plug 123. The piston valve 117 is effective to control flow to and from a passage 124 in the cap 96 and at its lower end communicating with a compound bore 126 extending through the recessed disc 88, the mounting disc 76 and the upper portion of the upper housing 71 and into the outer secondary compartment 73. The passage 124 not only opens through the valve sleeve 122 but, depending upon the momentary location of the piston valve 117 in its center, uppermost or lowermost position, also affords communication with a passage 127 in the cap 96 joined to a high pressure air supply port 128. The valve sleeve 122 also has a port communicating with a discharge bore 129 leading from the inside of the valve sleeve to the atmosphere.

With this arrangement, and assuming a relatively high pressure supply of air in the supply port 128, a relatively low pressure supply of air in the pipe connection aperture 97 is made effective, indirectly or as a servo-system. Thus, pursuant to some controlling factor, such as temperature making small changes in the pressure of the air at the pipe connection aperture 97, a corresponding but larger force is available to offset the bellows 74. The flexible discs 79 and 81 are urged differentially, because of their differentially exposed areas, and also are affected by the operation of the spring 104 to move the actuating lever 113 pursuant thereto. This relatively minor or fractional motion operates the piston valve 117 sufficiently so that the higher pressure supply of air from the supply port 128 is led into the outer, secondary compartment 73 and causes a corresponding movement of the stem disc 77 and the upper actuator stem 56 with the fluctuation in actuating air pressure in the pipe connection aperture 97. Thus, through the various valve stem actuating components the valve needle 19 is itself correspondingly moved toward and away from the valve seat thimble 11 and correspondingly controls flow from the inlet port 7 to the outlet port 8.

The high pressure air for the supply port 128 can be controlled by a remote mechanism if desired or can be controlled as shown herein particularly in FIG. 4. In such arrangement, the cap 96 has a high pressure air port 141 leading to a passage 142 in a plug 143 in the cap 96. The plug 143 is isolated by sealing rings 144. The passage 142 leads to a compartment 146 in which a valve 147 at the lower end of a magnetically responsive core 148 is designed to operate. A spring 149 urges the responsive core 148 in one direction toward closed position, whereas a solenoid coil 151 when energized overcomes the spring 149 and moves the valve 147 to an open position.

When the valve 147 is closed as shown in FIG. 4, pressure fluid from the high pressure air port 141 is available around the valve 147 and around the valve stem and magnetically responsive core 148 and to flow through an axial orifice 152 into a pipe connection 153 leading, as particularly shown in FIG. 1 and in FIG. 3, to the high pressure air supply port 128. When the solenoid coil 151 is not energized, there is a substantial supply of pressure fluid through the solenoid mechanism to the high pressure air supply port 128. When the solenoid coil 151 is energized, the magnetically responsive core 148 is lifted against the urgency of the spring 149 by the solenoid coil 151, and the axial orifice 152 is closed off by a sealing disc 154 at the upper end of the magnetically responsive core 148. At the same time, the valve 147 is opened and the pressure fluid from the high pressure air port 141 travels into a passage 156 leading to the atmosphere. Pressure air is not available for the outer secondary compartment 73, and the valve needle 19 seats by spring pressure. When the solenoid coil 151 is deenergized, the former pressure valve operation resumes.

In some instances, the valve as described can be utilized in a less elaborate form by the removal of all of the structure shown in FIG. 3 above the mounting disc 76.

Figure 5:
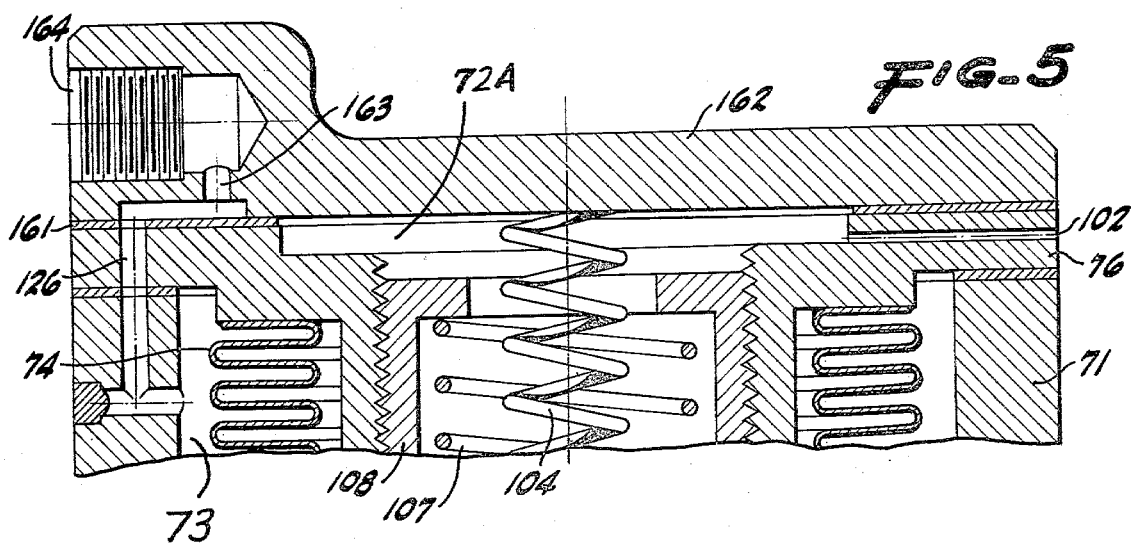
FIG. 5 is a fragmentary view in cross-section similar to FIG. 3 and showing a modified form of device.

In that instance, as shown in FIG. 5, the mounting disc 76 is provided with a new gasket 161 against which a cover plate 162 is appropriately secured. The springs 104 and 107 then rest on the under face of the new cover plate 162 and on the threaded cup 108, as before. Access to and from the compound bore 126 is had through a passage 163 in the cover plate 162 opening into a threaded bore 164 for connection to a suitable source of fluctuating or control pressure fluid. The interior of the new inner primary compartment 72A, so defined, communicates with the atmosphere through the breathing passageway 102 as before, so that by simply varying the pressure in the threaded bore 164 the pressure outside the bellows 74 and in the outer secondary compartment 73 is also varied. The bellows is made to move correspondingly and similarly moves the valve needle 19 through its interconnected stem components.

I claim:

1. A control valve comprising a valve body having a valve orifice and inlet and outlet ports open to said orifice, a valve stem movable along an axis in said body toward and away from said orifice, a first bellows engaging said valve body and said valve stem for precluding leakage therebetween, an actuator housing joined to said valve body and defining a first compartment and a second compartment spaced along said axis, an actuator stem secured to said valve stem and extending through said first compartment into said second compartment, circuit control mechanism on said actuator stem in said first compartment, a first divider wall closing an end of said first compartment, a mounting disc at the end of said second compartment, a second bellows engaging said actuator stem and said mounting disc for precluding leakage therebetween, a diaphragm unit spanning an end of said second compartment and at least partially defining a chamber, flexible disc means in said diaphragm unit and at least partially spanning said chamber, means including a spring for transmitting movement along said axis between said diaphragm unit and said actuator stem, a cap overlying said diaphragm unit and at least partially overlying said chamber, a piston valve in said cap, means including said piston valve for conducting pressure fluid to and from said second compartment, and means for interconnecting said diaphragm unit and said piston valve for conjoint action.

2. A device as in claim 1 in which said diaphragm unit includes a pair of spaced, flexible discs enclosing a volume, and means for supplying a pressure fluid to said volume.

3. A device as in claim 1 in which said piston valve includes a sleeve having ports therethrough, includes a piston having lands adapted to slide within said sleeve over said ports, and includes means for connecting some of said ports to a supply of pressure fluid and others of said ports to said second compartment.

4. A device as in claim 3 including a lever having a fulcrum on said cap, engaging said piston and actuated through an intermediary by said actuator stem.

5. A device as in claim 4 in which said intermediary is a spring.

6. A device as in claim 2 in which said discs have different effective areas.

* * * * *